United States Patent
Sugiyama

[11] Patent Number: 6,123,623
[45] Date of Patent: Sep. 26, 2000

[54] VEHICLE PROPELLER SHAFT WITH A BALANCE CORRECTOR

[75] Inventor: Kenichi Sugiyama, Isehara, Japan

[73] Assignee: Unisia Jecs Corporation, Atsugi, Japan

[21] Appl. No.: 08/952,207

[22] PCT Filed: Mar. 17, 1997

[86] PCT No.: PCT/JP97/00833

§ 371 Date: Nov. 6, 1997

§ 102(e) Date: Nov. 6, 1997

[87] PCT Pub. No.: WO97/36158

PCT Pub. Date: Oct. 2, 1997

[30] Foreign Application Priority Data

Mar. 22, 1996 [JP] Japan ................................. 8-066848

[51] Int. Cl.[7] .................................................. F16C 3/00
[52] U.S. Cl. ............................................................ 464/180
[58] Field of Search .................................. 464/127, 134, 464/162, 179, 180, 183

[56] References Cited

U.S. PATENT DOCUMENTS

| | | | |
|---|---|---|---|
| 3,887,024 | 6/1975 | Takahashi et al. | 464/127 |
| 3,940,948 | 3/1976 | Schultenkamper | 464/127 |
| 4,580,996 | 4/1986 | Brissette | 464/162 |
| 4,614,506 | 9/1986 | Sakata | 464/162 |
| 4,724,708 | 2/1988 | Okano et al. | 464/180 |
| 4,887,989 | 12/1989 | Kerecman | 464/180 |
| 4,895,551 | 1/1990 | Fritz | 464/180 |
| 5,099,430 | 3/1992 | Hirsch . | |
| 5,195,930 | 3/1993 | Hirano et al. | 464/180 |
| 5,203,740 | 4/1993 | Okuzumi et al. | 464/180 |
| 5,230,658 | 7/1993 | Burton | 464/162 |
| 5,457,992 | 10/1995 | Guimbretiere | 73/468 |
| 5,716,276 | 2/1998 | Mangas et al. | 464/134 |
| 5,868,517 | 2/1999 | Aoki et al. | 464/180 |
| 5,904,622 | 5/1999 | Breese et al. | 464/180 |

FOREIGN PATENT DOCUMENTS

| | | | |
|---|---|---|---|
| 2687747 | 8/1993 | France | 464/127 |
| 3140368 | 1/1983 | Germany | 464/180 |
| 39 06 114 | 2/1989 | Germany . | |
| 40-6117494 | 4/1994 | Japan | 464/180 |
| 6-65649 | 9/1994 | Japan . | |
| 465259 | 5/1937 | United Kingdom | 464/180 |
| 2041159 | 9/1980 | United Kingdom | 464/180 |

*Primary Examiner*—Lynne H. Browne
*Assistant Examiner*—Greg Binda
*Attorney, Agent, or Firm*—Foley & Lardner

[57] ABSTRACT

A vehicle propeller shaft and a method thereof has a balancer. The shaft has a slip joint having a first portion with male splines and a second portion with complementary female splines. The male and female splines are joined together with a spline clearance. A first univeral joint member is connected to the first portion of the slip joint and a second univeral joint member is connected to the second portion of the slip joint. The shaft further has first and second connected members each having a flange section. The first connecting member is connected to and extends axially outwardly from the first univeral joint member. The second connecting member is connected to and extends axially outwardly from the second universal joint member. A phase-changing restricting member is fixed at an outer peripheral portion of the slip joint to restrict the change of a locational relative phase between the male and female splines, which change is caused by the spline clearance between the male and female splines. An unbalance correcting member or balancer is fixed to the flange section of at least one of the first and second connecting members to finally balance the propeller shaft.

6 Claims, 3 Drawing Sheets

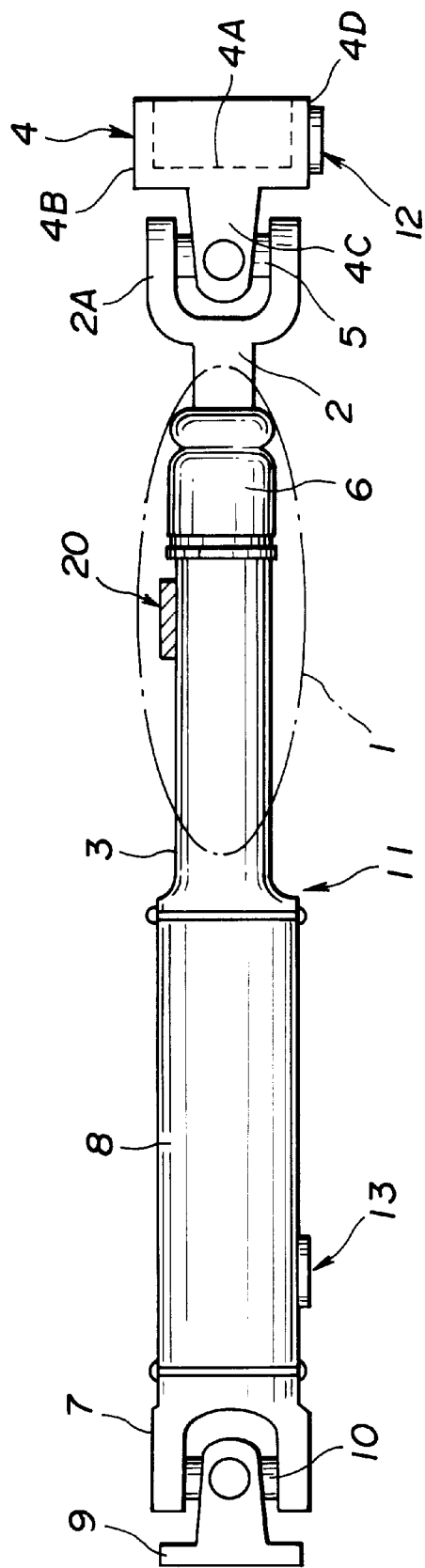
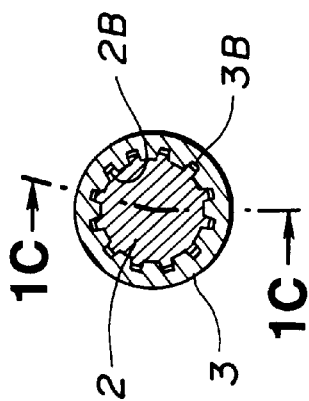
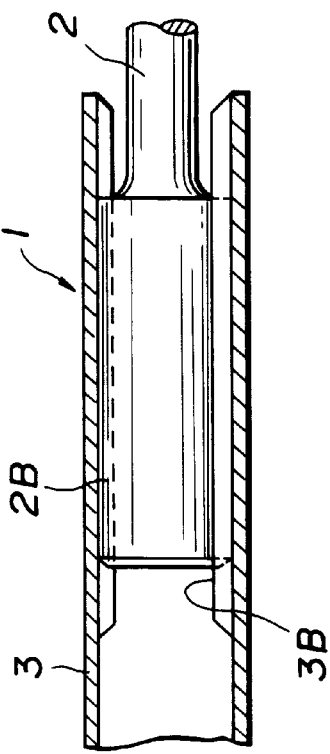

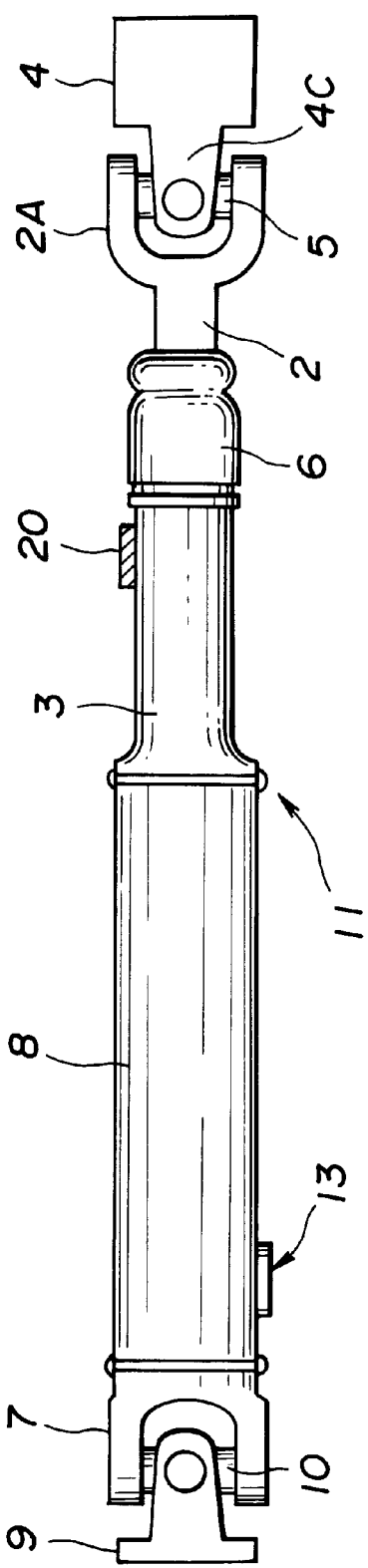
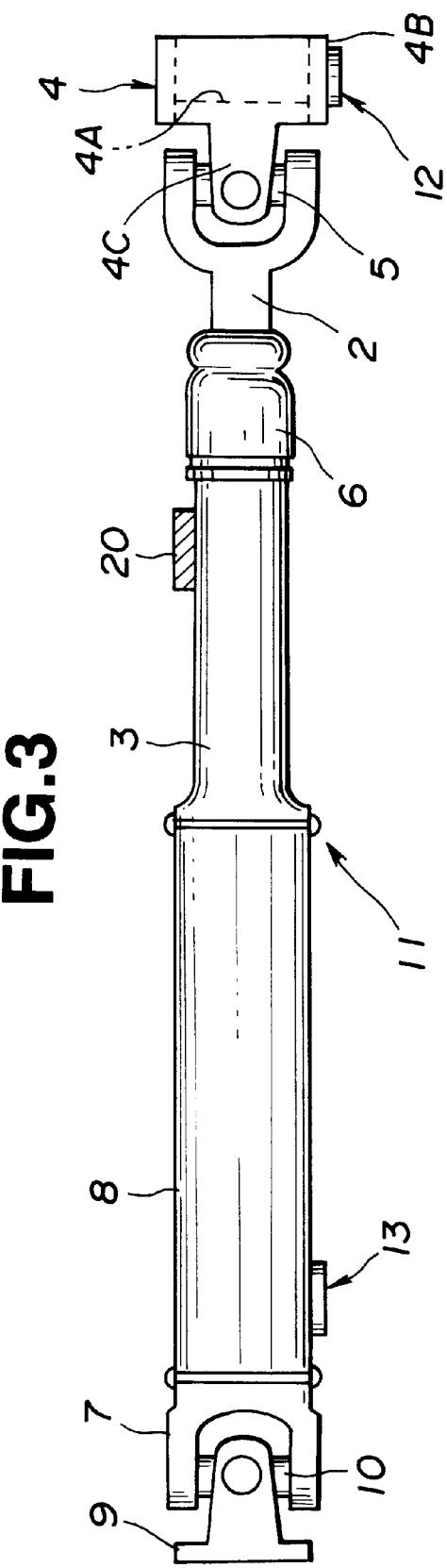
FIG.2
FIG.3

VEHICLE PROPELLER SHAFT WITH A BALANCE CORRECTOR

TECHNICAL FIELD

This invention relates to improvements in a propeller shaft for a vehicle and in a method of correcting unbalance of the propeller shaft, and more particularly to the improvements in the propeller shaft including a sliding joint using splines and in the balance correcting method for the same propeller shaft.

BACKGROUND ART

A propeller shaft used in a power transmission system for a vehicle (such as an automotive vehicle) has been provided with universal joints and a slip joint. The propeller shaft is required to be free of unbalance during rotation. It has been proposed that such unbalance be corrected at a connecting member which is connected to a differential or a transmission, as disclosed in Japanese Utility Model Publication No. 6-65649. In this technique, an eccentric load generated through the connecting member in the propeller shaft is field-balanced in a stepless manner, in which means for adjusting balance of the propeller shaft is disposed at the flange section of the connecting member. Otherwise, it has been known that a balance weight for correcting unbalance of the propeller shaft be attached to the outer peripheral surface of the propeller shaft which has a slip joint, thereby reducing an unbalance force developed at the connecting members on engine power output and input sides.

However, where a propeller shaft is provided with a slip joint, including splines located between a sleeve shaft and a stub yoke or between a sleeve yoke and a stub shaft, an externally splined shaft is fitted in an internally splined sleeve so that a clearance is formed between the splines of the shaft and the splines of the sleeve. Under existence of this clearance, the splin shaft and the splined sleeve are allowed to radially move relative to each other, thereby changing the locational relative phase between the splined shaft and the splined sleeve. Accordingly, even if the balance adjusting means is provided at the flange section of the connecting member or the balance weight is attached to the outer peripheral surface of the propeller shaft, unbalance correction for the propeller shaft cannot be stabilized owing to the fact that the locational relative phase between the splined shaft and the splined sleeve is changeable. Making a fine correction of the unbalance has been particularly difficult. As a result, it is required to repeat unbalance correction and unbalance measurement. This not only increases the number of steps for unbalance correction but also provides a low reproducibility of the correction, so that only a method of correcting the unbalance in a trial and error manner has been unavoidably employed.

SUMMARY OF THE INVENTION

An object of the present invention is to provide an improved method of correcting unbalance of a propeller shaft and an improved propeller shaft arranged by the same method, which can overcome drawbacks encountered in conventional methods of correcting unbalance of a propeller shaft and conventional propeller shafts arranged by the conventional methods.

Another object of the present invention is to provide an improved method of correcting unbalance of a propeller shaft and an improved propeller shaft arranged by the same method, by which a high balance of the propeller shaft can be obtained under easy and simple operations for correcting unbalance of the propeller shaft.

A further object of the present invention is to provide an improved method of correcting unbalance of a propeller shaft and an improved propeller shaft arranged by the same method, which can omit main causes for making unstable the unbalance correction for the propeller shaft owing to the clearance formed in the spline structure of a slip joint.

A still further object of the present invention is to provide an improved method of correcting unbalance of a propeller shaft and an improved propeller shaft arranged by the same method, in which a locational relative phase between inner and outer members constituting a spline structure can be effectively restrained from being changed during rotation of the propeller shaft thereby stabilizing measurement and correction of unbalance of the propeller shaft.

An aspect of the present invention resides in a method of correcting unbalance of a propeller shaft for a vehicle. The propeller shaft includes a slip joint having male and female splines fitted with each other. The propeller shaft also has first and second connecting members that connect to first and second support members of the vehicle, each connecting member having a flange section to be connected. The method comprises the following steps: (a) fixing a phase-changing restricting member at an outer peripheral portion of the slip joint to restrict change of a locational relative phase between the male and female splines, the change being caused by existence of a spline clearance between the male and female splines; (b) measuring unbalance of the propeller shaft provided with the phase-changing restricting member to obtain a measuring result, by connecting unbalance measuring means to the flange section of the first connecting member; and (c) applying an adjustment on the flange section of at least one of the first and second connecting members in accordance with the measuring result so as to accomplish a final correction of unbalance of the propeller shaft.

Another aspect of the present invention resides in a propeller shaft for a vehicle. The propeller shaft comprises a slip joint, including male and female splines fitted with each other. First and second connecting members can be connected to first and second support members of the vehicle. Each connecting member has a flange section. A phase-changing restricting member is fixed at an outer peripheral portion of the slip joint to restrict change of a locational relative phase between the male and female splines. The change is caused by existence of a spline clearance between the male and female splines. A device is provided to apply an adjustment on the flange section of at least one of the first and second connecting members to correct unbalance of the propeller shaft in a state to be provided with the phase-changing restricting member in order to accomplish a final correction of unbalance of the propeller shaft.

According to the above unbalance correcting method and the propeller shaft arranged by the same method, by virtue of the phase-changing restricting member fixed on the outer peripheral portion of the slip joint, the locational relative phase between the male and female splines is restrained or prevented from being changed although the propeller shaft uses the slip joint which has been a cause to change the locational relative phase and to provide unstable measuring values representing unbalance of the propeller shaft. Under this state, the final correction of unbalance of the propeller shaft is accomplished by applying the final unbalance correction at the flange section of at least one of the first and second connecting members. Additionally, correction of unbalance of the propeller shaft can be stably achieved even against slight unbalance, particularly where the target value of correction is considerably low. Besides, dispersion in actually measured unbalance amounts are suppressed low though the dispersion has been conventionally large. Accordingly, the number of steps required for correction of balance of the propeller shaft can be reduced while shortening the time required for the balance correction. This contributes to improvement in productivity and reduction of production cost, thereby providing the propeller shaft which is balanced with a high precision, at a low cost.

BRIEF DESCRIPTION OF DRAWINGS

FIG. 1A is a side view of an embodiment of a propeller shaft according to the present invention;

FIG. 1B is a sectional view of an essential part of the propeller shaft of FIG. 1A;

FIG. 1C is a fragmentary sectional view taken in the direction of arrows substantially along the line 1C—1C of FIG. 1B;

FIG. 2 is a side view similar to FIG. 1A but showing another embodiment of the propeller shaft according to the present invention;

FIG. 3 is a side view similar to FIG. 1A but showing a further embodiment of the propeller shaft according to the present invention;

BEST MODE FOR CARRYING OUT THE INVENTION

Figure 4:
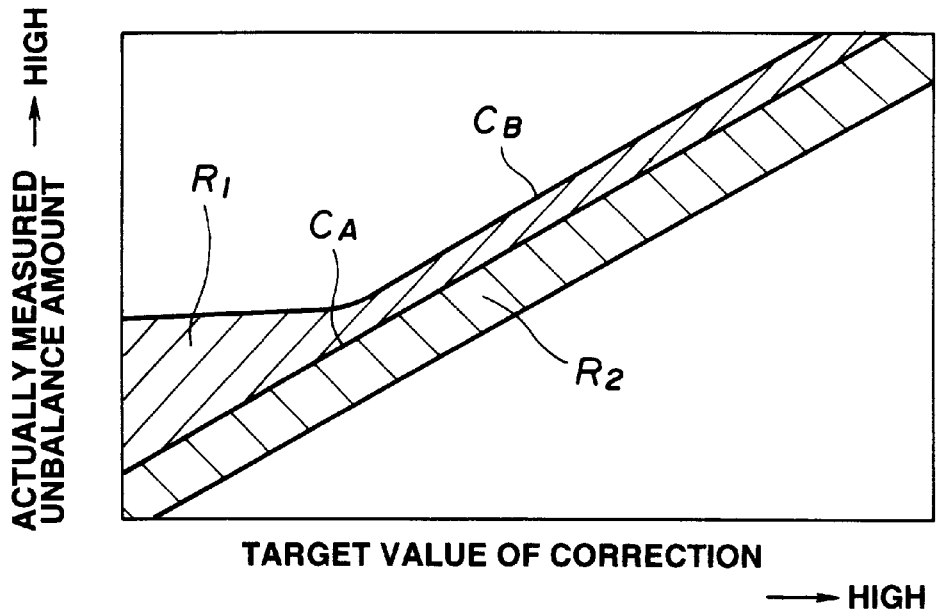
FIG. 4 is a graph showing the relationship between "Target Value of Correction" of unbalance of the propeller shaft and "Actually Measured Unbalance Amount" obtained by the target value, upon comparison between the present invention and the conventional technique.

Referring now to FIGS. 1A to 3A, an embodiment of a propeller shaft (drive shaft) for a vehicle, according to the present invention is illustrated by the reference numeral 11. The propeller shaft 11 of this embodiment is for an automotive vehicle and comprises a slip joint 1 disposed between a stub yoke 2 and a sleeve shaft 3. A flange yoke 4 as a connecting member 4 is connected through a cross-and-yoke universal joint member (or cross) 5 to a yoke section 2A of the stub yoke 2. The flange yoke 4 is connected, for example, to the input pinion (a support member) of a differential or final speed-reduction device as a vehicle power output mechanism. It is to be noted that a final unbalance correction of the propeller shaft 11 according to the present invention will be made on this flange yoke 4. The slip joint 1 is constituted of male splines 2B (parallel keys) formed at the outer peripheral portion of the stub yoke 2, and female splines (parallel grooves) 3B formed at the inner peripheral surface of a cylindrical portion (not identified) of the sleeve shaft 3, in which each male spline 2B is axially slidably fitted in the corresponding female spline 3B thereby absorbing axial extension and contraction of the propeller shaft 11.

A dust boot 6 made of an elastomeric material is disposed at an end section of the slip joint 1. More specifically, the dust boot 6 is generally cylindrical and has a first cylindrical end portion fitted around the cylindrical end portion (forming part of the slip joint 1) of the sleeve shaft 3. A second cylindrical end portion of the dust boot 6 is fitted around the outer peripheral surface of the stub yoke 2. A lubricant (not shown) is filled inside the dust boot thereby smoothing a sliding action in the slip joint 1 while preventing dust and like from penetrating into the slip joint 1.

A ball yoke 7 is connected integrally through a tube section 8 with the sleeve shaft 3. The ball yoke 7 is connected through a cross-and-yoke universal joint member (or cross) 10 to a flange yoke 9 (as another connecting member) which is to be connected, for example, to a transmission output shaft (not shown) as another support member.

Here, location for installation of an unbalance correcting members or balance weights will be discussed with reference to FIG. 1A.

The flange yoke 4 is provided with a correcting member fixing structure 4D to which an unbalance correcting member (balance weight) 12 can be located and fixed at a suitable position. The flange yoke 4 may be connected to an unbalance measuring apparatus (not shown) for measuring an unbalance of the propeller shaft 11. The correcting member fixing structure 4D is disposed to the outer peripheral portion of the flange yoke. The unbalance correcting member 12 functions to finally correct an eccentric load generated in the propeller shaft 11 and therefore referred hereinafter to as a final unbalance correcting member.

The flange yoke 4 includes a flange section 4A. An extended section 4B is formed extended from the outer peripheral portion of the flange section 4A. Fork sections 4C are formed projecting from the flange section 4A and adapted to be connected with the cross 5. In this embodiment, the above-mentioned correcting member fixing structure 4D of this embodiment is arranged such that the final unbalance correcting member 12 is installed to the outer surface of the extended section 4B during fabrication of the extended section 4B. The final unbalance correcting member 12 may be installed to the flange yoke 9 to be connected to the transmission as a vehicle power input mechanism.

The tube section 8 is provided at its outer peripheral surface with a tube unbalance correcting member (balance weight) 13 for removing unbalance caused, for example, by lack of uniformity in thickness of the tube section 8. A counter balance member (phase-changing restricting member or counter balance) 20 is installed on the outer peripheral surface of the sleeve shaft 3 for the purpose of suppressing a change in a locational relative phase between the stub yoke 2 (specifically the male splines 2B) and the sleeve shaft 3 (specifically the female splines 3B). This locational relative phase is established by the fact that the stub yoke 2 (specifically the male splines 2B) is radially one-sided relative to the sleeve shaft 3 (specifically the female splines 3B) owing to existence of a spline clearance between the male and female splines as shown in FIG. 1B. More specifically, the spline clearance is formed mainly between the top surface of the male spline (key) 2B and the bottom surface of the female spline (groove) 3B. Thus, the counter balance member 20 prevents the locational relative phase between the sleeve shaft 3 and the stub yoke 2 from being changed owing to existence of the spline clearance. In this connection, unbalance due to lack of uniformity in thickness of the tube section 8 is corrected upon installation of the tube unbalance correcting member 13 as discussed above.

Next, a procedure of correcting unbalance in the propeller shaft 11 arranged above will be discussed.

First, the correcting member fixing section 4D for the final unbalance correcting member 12 is formed at the outer peripheral surface of the extended section 4B of the flange yoke 4 at a step before assembly of the propeller shaft 11. In the sleeve shaft 3, the tube unbalance correcting member 13 is installed to the tube section 8 of the sleeve shaft 3 thereby correcting the unbalance due to lack of uniformity in thickness or the like of the tube section 8 per se. Under this state, the unbalance measuring apparatus is connected to the flange yoke 4 so as to measure the amount and phase of unbalance in the propeller shaft 11. In this measuring state, the stub yoke 2 (specifically the male splines 2B) is radially one-sided relative to the sleeve shaft 3 (specifically the female splines 3B) so that a radial relative location between the stub yoke 2 and the sleeve shaft 3 is in a phase (the locational relative phase). In this state, the spline clearance formed between the stub yoke 2 and the sleeve shaft 3 is one-sided at a part in peripheral direction, so that spline clearance is small at the above-mentioned part in peripheral direction. Subsequently, the counter balance member 20 is fixed at a position on the peripheral surface of the slip joint 3 of the sleeve shaft 3, the position being located in an area including the splines 2B, 3B and at the abovementioned part in peripheral direction. Such fixing the counter balance member 20 is made in a manner that the location of the counter balance member 20 can be slightly changed or corrected after. In other words, the counter balance member 20 is fixed in position, preferably, by using a binding tape, a hose band or the like, or by being temporarily welded. Thus, the counter balance member 20 is to be finally fixed in position after a scheme of total unbalance correction is completed.

After the above operation, the unbalance of the propeller shaft 11 is again measured by the unbalance measuring apparatus. In this case, the unbalance amount of the propeller shaft 11 increases by an amount corresponding to the counter balance member 20 installed to the sleeve shaft 3; however, no change in the locational relative phase is made. Thereafter, the final unbalance correcting member 12 having a suitable weight is installed to a suitable position at the extended section 4B (the correcting member fixing structure 4D) of the flange yoke 4, the suitable weight and the suitable position being selected so as not to change the locational relative phase, in accordance with the measured locational relative phase and the unbalance amount. Thus, correction of the unbalance of the propeller shaft 11 is completed.

FIG. 2 illustrates another embodiment of the propeller shaft 11 according to the present invention, which is similar to the embodiment of FIGS. 1A to 1C except for an installation structure for the final unbalance correcting member 12. In this embodiment, the flange yoke 4 is formed solid to integrally include the flange section 4A and the final unbalance correcting member 12. Additionally, the technique disclosed in Japanese Utility Model Publication No. 6-65649 may be applied to the flange yoke 4 of this embodiment.

FIG. 3 illustrates a further embodiment of the propeller shaft 11 according to the present invention, which is similar to the embodiment of FIGS. 1A to 1C except for an installation structure for the final unbalance correcting member 12. In this embodiment, the extended section 4B is arranged to be press-fitted around the peripheral portion of the flange section 4A. Accordingly, in the unbalance correction of the propeller shaft 11 according to this embodiment, first the weight (amount) of the final unbalance correcting member 12 is suitably adjusted. Thereafter, the location of the final unbalance correcting member 12 is set by adjusting the amount of press-fitting of the extended section 4B relative to the flange section 4A.

While some examples of the final unbalance correcting member 12 and the installation structure therefor to be provided to the flange yoke 4 have been shown and described, it will be understood that they are not limited to the above embodiments, so that the final unbalance correcting member and the installation structure therefor may be of types other than those of the above embodiments as far as they can freely correct the locational relative phase in the slip joint and the unbalance amount of the propeller shaft.

Here, advantageous effects of the above embodiment will be discussed with reference to FIGS. 4 and 5 in which a line "$C_B$" represents experimental data obtained by using the conventional technique or method of correcting unbalance of a propeller shaft, disclosed in Japanese Utility Model Provisional Publication No. 6-65649; and a line "$C_A$" represents experimental data obtained by using the method of correcting unbalance of the propeller shaft, according to the above embodiment of the present invention.

FIG. 4 shows experimental data illustrating the relationship between "Target Value of Correction" of unbalance of the propeller shaft and "Actually Measured Unbalance Amount" obtained by the target value. The data of the line $C_B$ denotes that, according to the conventional technique, it was difficult to lower the actually measured unbalance amount in a low correction target value range. However, the data of line $C_A$ denotes that, according to the present invention, the actually measured unbalance amount well corresponded to the target value of correction, demonstrating that correction of unbalance could be suitably accomplished in accordance with the target value of correction because the spline clearance could not change in peripheral direction or phase.

Figure 5:
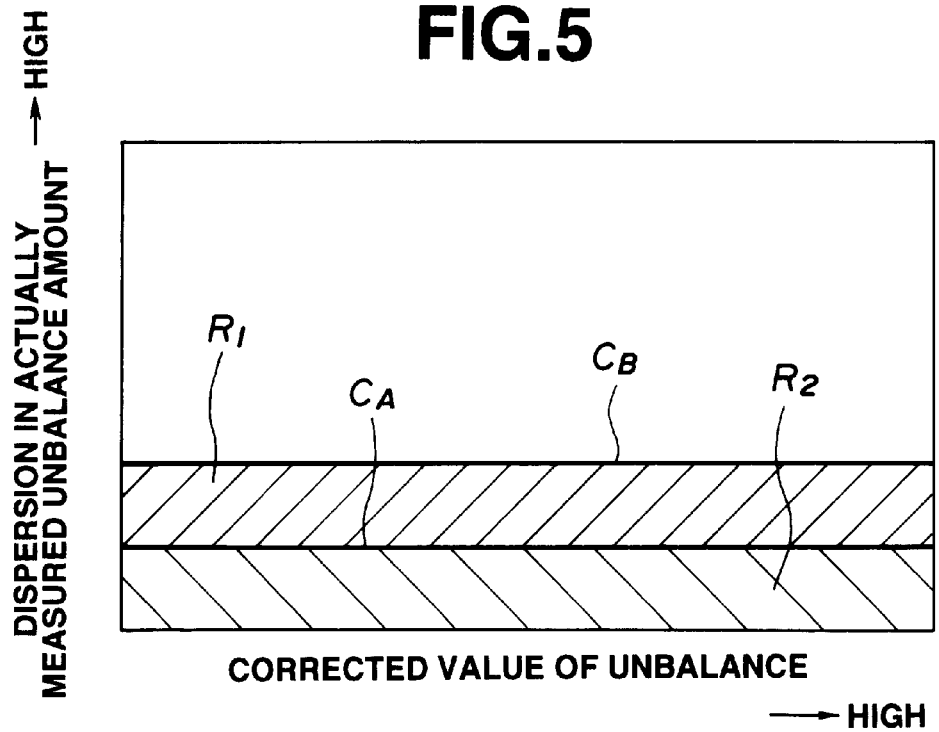
FIG. 5 is a graph showing the relationship between "Dispersion in Actually Measured Unbalance Amount" obtained under repeated measurements and "Corrected Value of Unbalance" of the propeller shaft, upon comparison between the present invention and the conventional technique.

FIG. 5 shows experimental data illustrating the relationship between "Dispersion in Actually Measured Unbalance Amount" obtained under repeated measurements and "Corrected Value of Unbalance" of the propeller shaft. FIG. 5 illustrates that, in case of repeating measurements of the unbalance amount, the dispersion of the measured unbalance amounts were suppressed at a lower value regardless of the corrected value of unbalance, according to the present invention (indicated by the line $C_A$), as compared with the conventional technique (indicated by the line $C_B$). Thus, according to the present invention, the reproducibility of unbalance correction of the propeller shaft was largely improved over that of the conventional technique. Throughout FIGS. 4 and 5, a hatched range "$R_1$" indicates the effects of the present invention, and another hatched range "$R_2$" indicates measurement error.

Industrial Applicability

A number of steps required for correction of balance of a propeller shaft can be reduced while shortening a time required for the balance correction. This contributes to improvements in productivity and reduction of production cost, thereby providing the propeller shaft which is balanced with a high precision, at a low cost.

What is claimed is:

1. A propellar shaft for a vehicle, comprising:
    a slip joint having a first portion with male splines and a second portion with complementary female splines, said male and female portions being fitted together, a spline clearance formed between said male and female splines;

a first univeral joint member connected to said first portion of said slip joint, and a second univeral joint member connected to said second portion of said slip joint;

first and second connecting members each having a flange section, said first connecting member being connected to and extending axially outwardly from said first univeral joint member, and said second connecting member being connected to and extending axially outwardly from said second univeral joint member;

a phase-changing restricting member fixed at an outer peripheral portion of said slip joint to restrict change of a locational relative phase between said male and female splines, which change is caused by said spline clearance between said male and female splines; and an unbalance correcting member fixed to said flange section of at least one of said first and second connecting members to finally balance said propeller shaft.

2. A propeller shaft as claimed in claim 1, wherein said phase-changing restricting member is located at a position determined by the locational relative phase, said position being at the outer peripheral portion of said second portion of said slip joint.

3. A propeller shaft as claimed in claim 2, wherein said first portion comprises a shaft section provided with said male splines, and said second portion comprises a sleeve section provided with said female splines, and wherein said propeller shaft further includes a cylindrical section integral with said sleeve section, said first universal joint being connected to said shaft section and said second universal joint being connected to said cylindrical section, wherein said slip joint is constituted by a part of said shaft section and a part of said sleeve section, each part having one of said male and female splines.

4. A propeller shaft as claimed in claim 3, wherein said phase-changing restricting member is located at said position on the outer peripheral portion of said sleeve section.

5. A propeller shaft as claimed in claim 4, further comprising a second unbalance correcting member fixed at an outer peripheral portion of said cylindrical section to further correct unbalance of said propeller shaft.

6. A propeller shaft as claimed in claim 1, wherein said unbalance correcting member is fixed to said flange section of said first connecting member, the weight and location in said flange section of said first connecting member being selectable.

* * * * *